Patented Sept. 8, 1925.

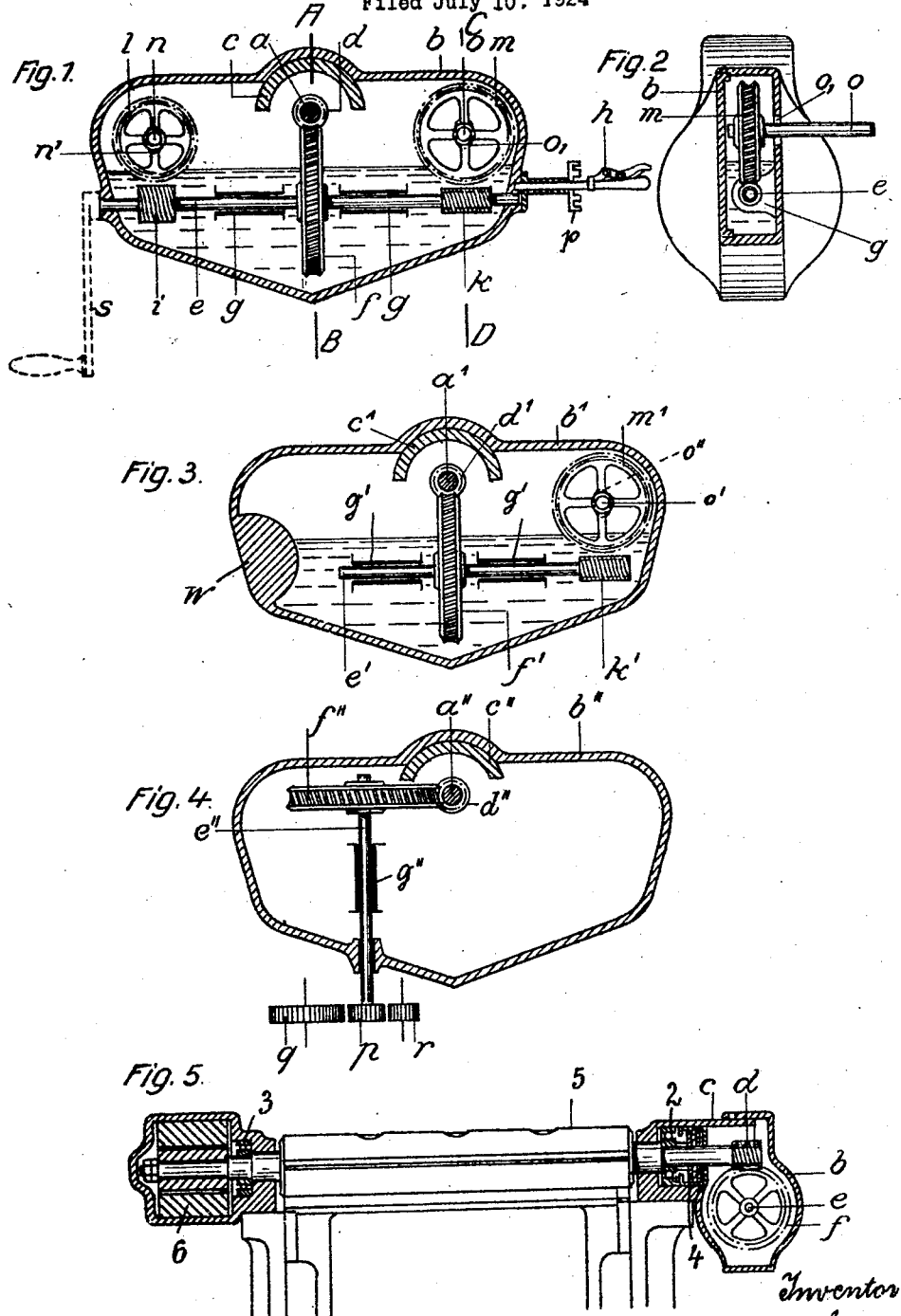

1,552,516

UNITED STATES PATENT OFFICE.

JONATHAN STERNKOPF, OF RITTERSGRUN, GERMANY.

GEAR CASE.

Application filed July 10, 1924. Serial No. 725,174.

*To all whom it may concern:*

Be it known that I, JONATHAN STERNKOPF, a citizen of Germany, residing at Rittersgrun, in Saxony, Germany, have invented certain new and useful Improvements in Gear Cases (German application filed June 30, 1922), of which the following is a specification.

My invention relates to change speed gears and more especially to that type of gear in which the several parts of the gear are enclosed in a case filled with oil. It is an object of my invention to utilize this gear case for changing the gear ratio. To this end I secure the gear case pivotally on the machine with which the gear is designed to cooperate, for instance, on the driving shaft of a wood working machine where it may serve for changing the speed of the feed rollers. By turning the gear case on its pivot the feed rollers are thrown in alternately so that the rate of feed is changed. The novel gear can also be used, for instance in connection with centrifugal separators or for starting synchronous motors.

In the drawings affixed to this specification and forming part thereof several devices embodying my invention are illustrated diagrammatically by way of example. In the drawings Fig. 1 is a sectional elevation of a change speed gear for the feed rollers of a wood working machine.

Fig. 2 is a section on the line C—D in Fig. 1, viewed from the right in Fig. 1.

Fig. 3 is a sectional elevation of a gear for operating a single feed roller only, and Fig. 4 is a similar view of a gear in which the parts whose speed shall be changed or whose direction of rotation shall be reversed, are arranged outside the gear case, Fig. 5 is a section on the line A—B in Fig. 1 drawn to a reduced scale and showing the arrangement of the gear case in relation to the driving shaft.

As shown in Fig. 5, the driving shaft $a$ is carried in ball bearings 2 and 3 secured on the frame 1 of the machine. The bearing 2 is combined with a thrust bearing 4. The casing of the bearings 2 and 4 is formed with a hollow semi-cylindrical extension $c$ coaxial with the shaft $a$ which forms a fulcrum for a gear case $b$ mounted for free rocking motion on the extension $c$.

Figs. 1 and 2 show the gear case $b$ on a larger scale. The case forms an oil bath for the parts rotating therein. A worm $d$ on the driving shaft $a$ imparts rotation to a worm wheel $f$ which is fixed on a lay shaft $e$ carried in bearings $g$, $g$ of the case $b$. Worms $i$ and $k$ are fixed on the ends of the lay shaft $e$ and mesh with worm wheels $l$, $m$ on the shafts $n$ and $o$ of the feed rollers. Slots $n'$ and $o'$ are formed in the rear wall of the case $b$ to permit rocking of the case in relation to the shafts $n$ and $o$.

The case may be rocked about the axis of the driving shaft $a$ and fixed in position by any suitable means, such as for instance a toothed sector $p$ and a pawl $h$.

In the neutral position illustrated in Fig. 1 both feed rollers are idle. By rocking the case $b$ in one or the other direction one of the worms $i$ and $k$ is caused to mesh with its worm wheel $n$ or $m$ so that the corresponding feed roller is rotated.

A crank $s$ may be secured on the lay shaft $e$ as shown in dotted lines in Fig. 1, allowing the lay shaft to be rotated by hand.

The gear shown in Fig. 3 comprises only a single worm $k'$ and a worm wheel $m'$ on the shaft $o'$ of a feed roller. The lay shaft $e'$ on which the worm $k'$ is secured is carried in bearings $g'$, $g'$ in the case $b'$. The case is adapted to rock on the extension $c'$ about the axis of the driving shaft $a'$ on which is secured a worm $d'$ meshing with the worm wheel $f'$ on the shaft $e'$. A balance weight $w$ is formed in the wall of the case $b'$ opposite the worm $k'$. A slot $o''$ for the shaft $o'$ is formed in the rear wall of the case $b'$.

In the gear shown in Fig. 4 the case $b''$ is again adapted to be rocked on the extension $c''$ coaxial with the driving shaft $a''$ on which is secured a worm $d''$ meshing with a worm wheel $f''$ on the lay shaft $e''$ carried in a bearing $g''$. The lay shaft $e''$ projects from the case $b''$ and is provided with a spur wheel $p$ at its outer end which can be made to mesh with one or the other of two spur wheels $q$ and $r$, respectively, in accordance with the position imparted to the case $b''$.

I wish it to be understood that I do not desire to be limited to the exact details of construction shown and described, for obvious modifications will occur to a person skilled in the art.

I claim:—

1. Change speed gear comprising a main driving shaft, a case partly surrounding said driving shaft and adapted to rock on said driving shaft, a lay shaft rotatably carried in said case and connected with said driving shaft by worm gearing, and a stationary driven shaft adapted to be operatively connected with said lay shaft by rocking said case about said driving shaft.

2. Change speed gear comprising a main driving shaft, a case partly surrounding said driving shaft and adapted to rock on said driving shaft, a lay shaft rotatably carried in said case and connected with said driving shaft by worm gearing, and a stationary driven shaft projecting into said case on either side of said main driving shaft, said driven shaft being adapted to be alternately brought into and out of operative engagement with said lay shaft rocking said case about said driving shaft.

3. Change speed gear comprising a main driving shaft, a case partly surrounding said driving shaft and adapted to rock on said driving shaft, a lay shaft rotatably carried in said case and connected with said driving shaft by worm gearing, a stationary driven shaft adapted to be operatively connected with said lay shaft by rocking said case about said driving shaft, and a balance weight on said case opposite said driven shaft.

4. Change speed gear comprising a main driving shaft, a case partly surrounding and mounted for rocking motion on said main driving shaft, a lay shaft rotatably carried in said case and connected with said driving shaft by worm gearing, said lay shaft projecting from said casing, a spur gear on said lay shaft outside said casing and stationary spur gears arranged outside said case and on either side of said spur gear on said lay shaft, said spur gear being adapted to be alternately brought into engagement with said stationary gears by rocking said case about said driving shaft.

In testimony whereof I affix my signature.

JONATHAN STERNKOPF.